July 18, 1967  L. BAGNULO  3,331,622
DEVICE FOR BRANCHING-OFF A SECONDARY PIPING HAVING A CERTAIN
DIAMETER, FROM A MAIN PIPE HAVING ANY DIAMETER
Filed Jan. 19, 1965  2 Sheets-Sheet 2
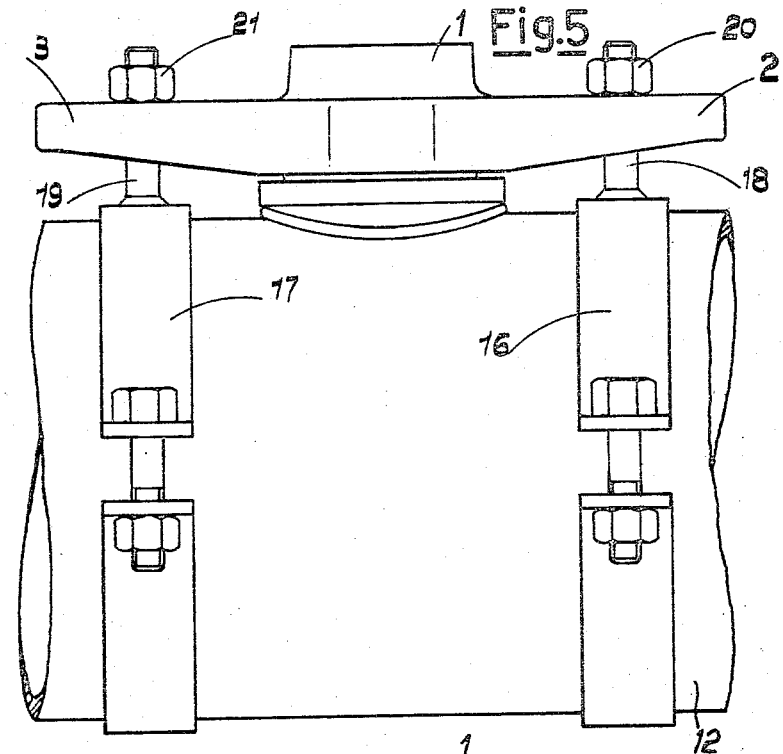
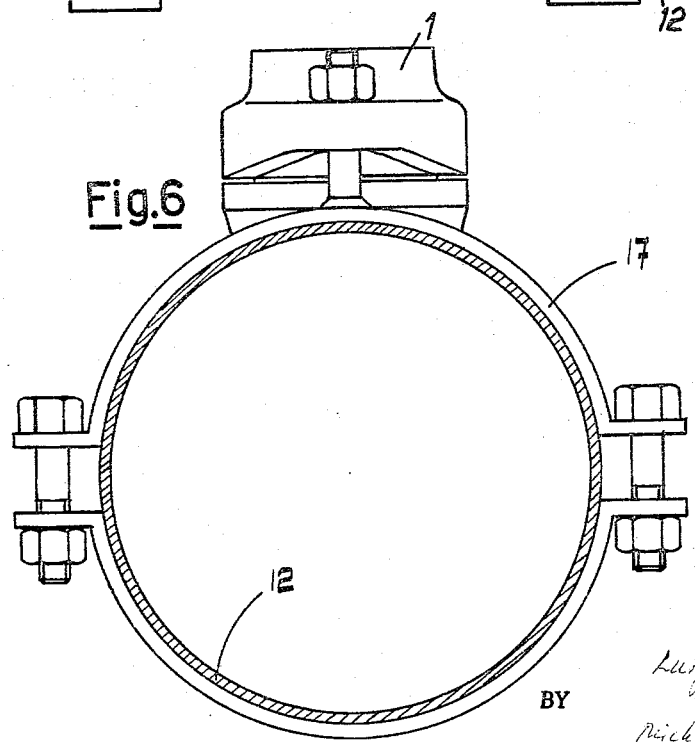
INVENTOR.
Luigi Bagnulo
BY
Michael J. Striker

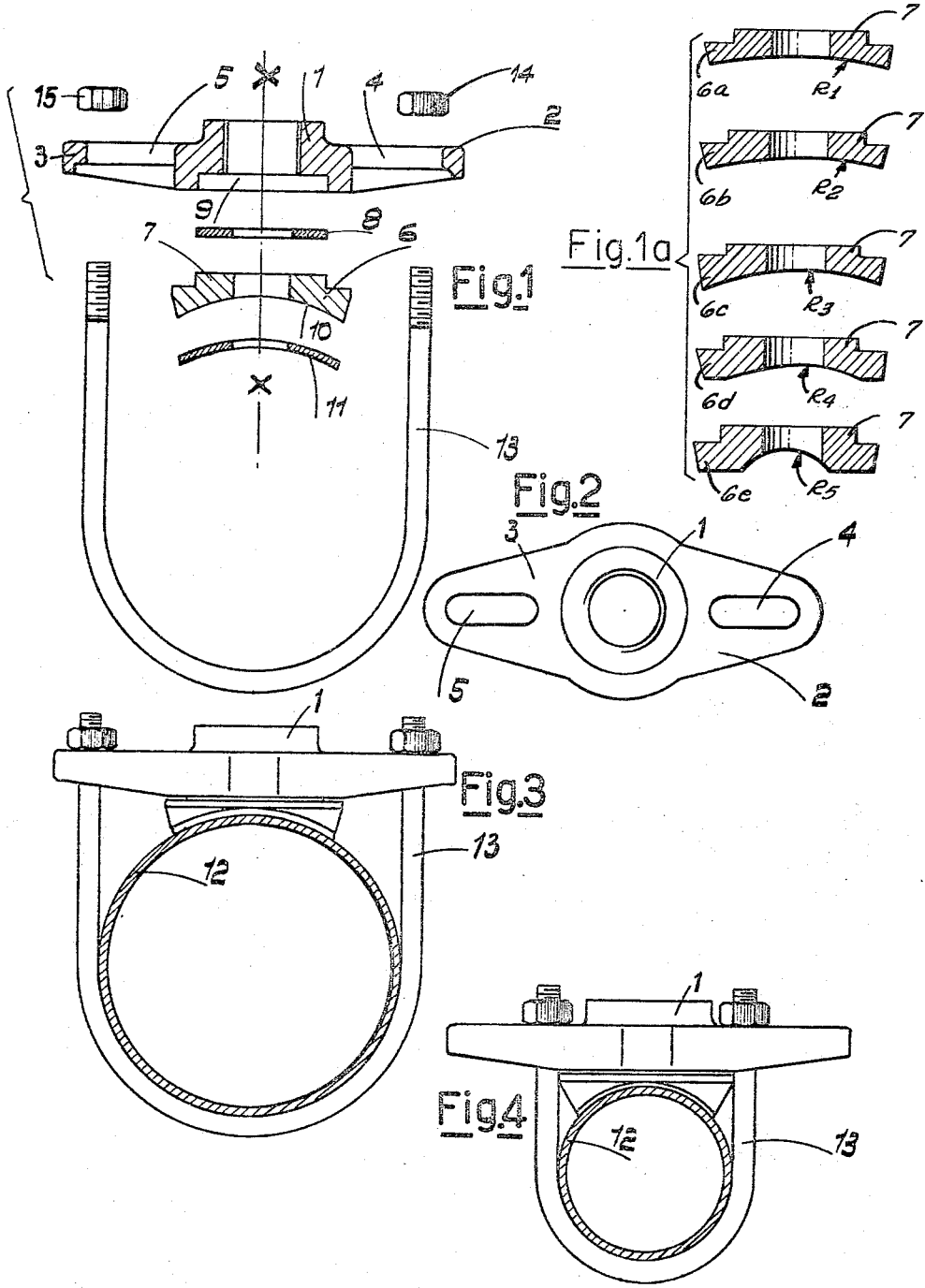

United States Patent Office 3,331,622
Patented July 18, 1967

3,331,622
DEVICE FOR BRANCHING-OFF A SECONDARY PIPING HAVING A CERTAIN DIAMETER, FROM A MAIN PIPE HAVING ANY DIAMETER
Luigi Bagnulo, Via A. Volta 18, Milan, Italy
Filed Jan. 19, 1965, Ser. No. 426,496
Claims priority, application Italy, Jan. 31, 1964, 2,161/64
5 Claims. (Cl. 285—198)

This invention relates to a "branching-off" device intended to branch-off a pipe section of a certain diameter from a main piping having any diameter.

In the present practice, a device for branching-off a secondary conduit from a main conduit essentially consists of a "gripping collar" which incorporates the fitting. The latter is connected, on one side, to the branched off conduit and, on the other side, around a through hole formed in the main pipeline, a stirrup piece being provided for affixing the ends of said collar to the main piping.

It is apparent that, by employing devices of the kind referred to above, since the fitting should have its end portion shaped so as perfectly to match the cylindrical surface of the main piping, it is essential, for every "branching off" item having a certain diameter, to have at hand as many gripping collars as there are diameters of the main pipelines from which "branching-offs" are to be effected for that particular certain diameter.

If one bears in mind that in the conventional networks for the supply of gas or water, the usual branching off fittings cover a range of as many as six to eight different diameters and that the main pipings cover a range of 15 to 20 different diameters, it can be readily realized that a supplier's company in big towns is bound to keep in storage a huge and expensive set of gripping collars which could include from 90 to 160 different types.

Attempts have been made towards a slight reduction of so wide series by adopting in a few cases the same gripping collar for conduits having a diameter which was slightly different from its allotted diameter. This expedient, however, has given rise not to negligible shortcomings owing to the unsatisfactory matching between the end portion of the fitting and the surface of the conduit, i.e. to an uneven distribution of the pressure over the sealing gaskets with the attendant risk of causing heavy leakages to occur.

The subject-matter of this invention is a branching off device whose object is to do away the drawbacks indicated above and to restrict to a degree the number of branching-off devices to be applied to a wide range of conduit diameters.

The device according to the present invention is formed by a tubular member communicating, on the one side, with the secondary or branched off conduit and, on the other side, with the main conduit through a ring-shaped member inserted so as to be grafted coaxially with said tubular member and terminated by a saddle-shaped surface capable of perfectly matching the cylindrical surface which surrounds the bore formed through the main conduit, the whole assembly being affixed and clamped onto the main conduit, sealing gaskets being inserted therebetween, by means of at least one stirrup piece which encompass, at least for a fraction, the main conduit and abuts the lateral extensions protruding from the body of said tubular member.

It is obvious that the device of the present invention allows to apply the branching-off of a secondary conduit of a certain diameter to main conduits having different diameters, by keeping the tubular member unaltered and replacing the inserted ring-shaped member only, whose end surface has a different shape according to the diameter of the main conduit to which it should be matched.

Another feature of the inventive device lies in that the matching surfaces for the "grafting" between the tubular and the ring-shaped members are surfaces of solids of revolution about the common geometrical axis, and it is thus possible to keep the ring-shaped member fixed while causing the relative position of the tubular member to be varied.

More particularly, this fact allows to arrange the tubular member with the lateral extensions oriented either along the direction of the axis of the main conduit, or along a direction perpendicular thereto. In the former case, which is particularly suitable for main conduits having a large diameter, the device is affixed by two parallelly arranged stirrups which completely encompass the conduit and abut, with the instrumentality of radially mounted bolts, to the corresponding extensions. In the latter case, which is more suitable for main conduits having smaller diameters, the abutment is brought about with the aid of a single U-shaped stirrup whose tines, even though they have different distance between their own axes consistently with the diameters of the conduits concerned, are none the less capable of abutting the extensions of the tubular member: this latter is specially provided, to this end, with longitudinally running notches or slots.

It is apparent that the connection of the tubular member to the secondary conduit can be put into practice with any optional conventional method, such as, for example, by a flange, a spigot and socket joint, or a screw-threaded joint.

It is likewise obvious that in the case of mounting of a valve coaxial with respect to the tubular member, this latter will have a lateral fitting for the secondary conduit. In this case, the valve seating could be an integral part of said element or it could also be formed in the ring-shaped member. Also, the ring-shaped member could have a tubular extension which, passing through the bore of the tubular member, is directly connected to the secondary conduit.

The foregoing and other characteristics, features and advantages of the invention will be better understood by the particular description of a few embodiments thereof shown by way of illustration only, in the accompanying drawings.

In the drawings:

FIGURE 1 is an axial sectional view of the individual items which form the device.

FIGURE 1a is an axial sectional view of a set of ring-shaped members to be respectively used with the other elements of the device.

FIGURE 2 is a plan view of the tubular member.

FIGURES 3 and 4 are illustrative of the application of the same device to two main conduits having different diameters.

FIGURES 5 and 6 are a side view and a front view, respectively, of the device as applied to a conduit of large diameter with the extensions oriented along the direction of the pipeline's axis.

Having now reference to the drawings, the device comprises a tubular or elongated member 1 (e.g. obtained by casting), with its lateral extensions 2 and 3 fitted with longitudinal slots 4 and 5; a ring-shaped member 6 which, with its embossment 7 and with the insertion of a gasket 8, is inserted into a countersunk seating 9 formed in the tubular member 1, whereas, on the opposite side, it is terminated by a saddle-shaped member 10 to match, with the insertion of a gasket 11 therebetween, the cylindrical outer surface of the main pipeline 12. The member 6 with the gaskets 8 and 11 form bridging means between the member 1 and the main pipe line or conduit 12. The assembly is positioned and clamped by means of the U-shaped stirrup 13 the ends of whose tines are screw-threaded (as very diagrammatically shown in FIG. 1) and receive nuts such as 14 and 15 abutting the lateral extensions 2 and 3.

Since the surfaces of the coupling 7–9 are surfaces of a solid of revolution about the common axis X—X, the tubular member 1 can be rotated about the piece 6, so that the lateral extensions 2–3 can be positioned (as in FIGS. 3 and 4) along a direction perpendicular to the axis of the conduit 12 or, also, as shown in FIGS. 5 and 6, along this very axis. In this latter case, especially suitable for conduits having a large diameter, the coupling is effected with the aid of two stirrups 16 and 17 which completely encompass the conduit, and which, by means of the radially positioned bolts 18–19 and associated nuts 20–21 abut the lateral extensions 2–3 of the tubular member 1.

FIG. 1a shows a set of ring-shaped members 6a–6e to be used in connection with pipe lines 12 of different diameter. The curved bottom faces of the members 6a–6e have respectively radii of curvature $R_1$–$R_5$ according to the radius of the respective pipe line, but the upwardly projecting portion 7 is identical for all members of the set.

While the invention has been shown and described in connection with a few preferred embodiments thereof, it is apparent to all those who are skilled in the art that mechanical modifications can be introduced therein without implying any restriction of the scope thereof.

What I claim is:

1. A device for branching-off a secondary conduit from main pipe lines of different outer diameters comprising, in combination, an elongated member formed intermediate the ends thereof with a bore adapted to be substantially aligned with an opening through a wall in a respective main pipe line and to receive an end portion of said secondary conduit, said member having an end face facing the respective main pipe line spaced therefrom and extending transverse to said bore; first engaging means in the region of said end face about said bore; a set of bridging means respectively insertable between said end face of said elongated member and the outer surface of the respective main pipe line, each of said bridging means being formed with a bore therethrough adapted to be aligned, when a respective one of said bridging means is inserted between said end face of said elongated member and the outer surface of a main pipe line, with said bore in said member, all bridging means of said set of bridging means being formed on one side thereof with identical engaging means adapted to cooperate with said first engaging means on said one member for keeping said bores aligned along a common axis, and each of said bridging means of said set of bridging means having on the opposite sides thereof a concavely curved end face having a radius of curvature differing from that of the other bridging means of said set and respectively matching the outer surface of one of said main pipe lines of different diameters; and pressing means connected to said member and engaging the main pipe line used which has an outer radius substantially equal to the radius of curvature of the inserted bridging means for pressing said member against the bridging means inserted between said member and the main pipe line and the respective bridging means against the main pipe line.

2. A device as set forth in claim 1, wherein said first engaging means and said identical engaging means are constructed and arranged for permitting angular adjustment of said member relative to the respective bridging means about said common axis so that said member may extend in direction of the axis of said main pipe line or substantially normal thereto.

3. A device as set forth in claim 2, wherein said elongated member extends substantially in direction of the axis of said main pipe line and wherein said pressing means include a pair of stirrup means respectively arranged to opposite sides of said bridging means and each substantially encompassing said main pipe line, and means connecting said pair of stirrup means respectively to opposite ends of said elongated member.

4. A device as set forth in claim 2, wherein said elongated member extends transverse to the axis of said main pipe line, and wherein said pressing means include a substantially U-shaped stirrup extending about said main pipe line, and means connecting the ends of said U-shaped stirrup respectively to opposite ends of said elongated member.

5. A device for branching-off a secondary conduit from an opening through a wall in a main pipe line comprising, in combination, an elongated member formed intermediate the ends thereof with a bore adapted to be substantially aligned with said opening in said main pipe line and to receive an end portion of said secondary conduit, and with a pair of elongated slots arranged to opposite sides of said bore, said member having one face facing said main pipe line spaced therefrom and extending transverse to said bore; bridging means sandwiched between said member and said main pipe line and having a first end face abutting against said one face of said member and an opposite concavely curved face substantially matching the outer surface of said main pipe line and abutting against the latter, said bridging means being formed with a bore therethrough substantially aligned along a common axis with said bore in said member; cooperating engaging means on said member and said bridging means for maintaining said bores aligned along said common axis while permitting angular adjustment of said elongated member relative to said bridging means about said common axis between at least two positions in one of which the elongation of said elongated member extends substantially parallel to the axis of said main pipe line and in the other of which said elongation extends substantially normal to said axis; and pressing means connected to said elongated member and engaging said main pipe line for pressing the bridging means which are sandwiched between said elongated member and said main pipe line against the latter, said pressing means include two stirrups respectively arranged to opposite sides of said bridging means and each substantially encompassing said main pipe line, and each having a radially extending bolt projecting with an end portion thereof through a respective one of said slots, and means connected to said end portions and engaging said member on a face thereof opposite said one face.

References Cited

UNITED STATES PATENTS

| 1,459,030 | 6/1923 | Mueller | 285—199 |
| 1,650,057 | 11/1927 | Wernle | 285—158 X |
| 2,100,884 | 11/1937 | Trickey | 285—199 |
| 2,997,316 | 8/1961 | Recht | 285—197 X |

FOREIGN PATENTS

| 1,049,172 | 1/1959 | Germany. |
| 204,147 | 9/1923 | Great Britain. |
| 757,074 | 9/1956 | Great Britain. |

CARL W. TOMLIN, *Primary Examiner.*